United States Patent [19]

Biddell

[11] 3,991,243

[45] Nov. 9, 1976

[54] METHOD OF MAKING A REINFORCED INSERT WELD AND RESULTING ARTICLE

[75] Inventor: William G. Biddell, Hayward, Calif.

[73] Assignee: Raychem Corporation, Menlo Park, Calif.

[22] Filed: Dec. 9, 1974

[21] Appl. No.: 530,687

[52] U.S. Cl. .............................. 428/61; 138/156; 156/157; 156/304; 156/309
[51] Int. Cl.² .................. B65H 69/02; B65H 69/06
[58] Field of Search .......... 156/157, 304, 306, 309, 156/295; 138/99, 155, 156, 158; 428/57, 58, 61, 53

[56] References Cited
UNITED STATES PATENTS

| 790,644 | 5/1905 | Lloyd | 138/156 |
| 2,388,297 | 11/1945 | Slaughter | 156/304 |
| 3,455,336 | 7/1969 | Ellis | 138/99 |
| 3,891,490 | 6/1975 | Humphries | 156/306 |
| 3,895,990 | 7/1975 | Josteit | 156/304 |

Primary Examiner—William A. Powell
Assistant Examiner—M. G. Wityshyn
Attorney, Agent, or Firm—Lyon & Lyon

[57] ABSTRACT

Thin walled sleeves of heat recoverable material are made by inserting the opposing edges of a length of heat recoverable material into a thermoplastic insert having incorporated therein a peroxide or other heat activatable crosslinking agent, placing a reinforcement comprising a foraminous member, for example, a strip of glass cloth, or other high melting material, of relatively open weave adjacent to the insert and in contact therewith, followed by heating the assembly to form a weld. Optionally, a combination of the foraminous member and film can be placed in contact with the insert.

17 Claims, 7 Drawing Figures

METHOD OF MAKING A REINFORCED INSERT WELD AND RESULTING ARTICLE

FIELD OF THE INVENTION

This invention relates to heat recoverable articles and the method by which they are made. More specifically, this invention relates to heat recoverable articles useful for providing protective coverings about a substrate and the method by which they are made from heat recoverable material.

BACKGROUND OF THE INVENTION

Frequently, it is desirable to provide a substrate with a covering which will protect it from a corrosive or otherwise hostile environment. Sleeves of thin walled polymeric material have proven to be useful for this purpose, particularly when the article has tubular or otherwise more or less regular elongate configuration. Particularly useful are sleeves fabricated from heat recoverable material. Such a sleeve can be constructed with a diameter large enough so that it can be easily positioned about a substrate. Then, owing to its ability to shrink to a smaller diameter when heated, the sleeve can be heat recovered so that it closely conforms to the substrate.

Heat recoverable materials suitable for making such sleeves are well known. For example, in Cook U.S. Pat. No. 3,086,242, the disclosure of which is incorporated by reference, a heat rcoverable material obtained from a radiation crosslinked polymeric material is described. Heat recoverable sleeves made from such a material have been found to be particularly useful as corrosion resistant coverings for the joints of large diameter pipes, for example those used for pipelines for the transmission of oil, gas or other fluids.

Sleeves of small diameter can be conveniently extruded but this is not the case with sleeves of a large enough diameter to be employed on large pipes. Therefore, the sleeves heretofore employed for such pipes have typically been of the "wrap around" type. Such sleeves are made by wrapping a length of heat recoverable material about the pipe or other substrate and joining its end edges by mechanical or other suitable means that prevent the ends from separating when the sleeve is recovered. Examples of such sleeves are described in the following U.S. Patents, the disclosures of which are incorporated by reference: Conde, U.S. Pat. No. 3,379,218, Ellis, U.S. Pat. No. 3,455,336, Wilson, U.S. Pat. No. 3,530,898 and Evans, U.S. Pat. No. 3,770,556.

To facilitate the installation of heat recoverable sleeves at the job site, it would be advantageous to have available a supply of prefabricated sleeves of large diameter. To accomplish that end, it has been proposed to form a sleeve by joining opposing edges of a sheet of polymeric material capable of having heat recoverability imparted thereto. The sleeve formed in this way is then expanded to the desired heat recoverable diameter by known methods. Such prior art sleeves are described in Naidoff, Ser. No. 436,674 filed Jan. 25, 1974 and Humphries, Ser. No. 476,895 filed June 6, 1974. These applications have the same assignee as the present invention and their disclosures are incorporated by reference. The pre-expanded sleeves described in those applications can be made by inserting the ends of the polymeric sheets into the channels of one or more generally I-shaped inserts fabricated from thermoplastic material that contains a cross-linking agent followed by heating the assembly under pressure to affect a weld.

A drawback to the aforementioned sleeves is that the process by which they are made heat recoverable is a slow one making the fabrication of a large number of sleeves impractical. One such process and the apparatus employed in its execution is described in Greuel et al., Ser. No. 436,675 filed Jan. 25, 1974, an application having the same assignee as the present invention, the disclosure of which is incorporated by reference.

By contrast, sheet material already having the property of being heat recoverable can be made at a high rate of speed. Therefore, it would be advantageous if large diameter heat recoverable sleeves could be fabricated directly from a sheet of preformed heat recoverable material. Prior to this invention, direct formation of a heat recoverable sleeve has been accomplished by bringing opposing edges of a length of heat recoverable material into an abutting relationship and overlaying the bond line with a length of a laminate comprising a glass cloth sandwiched between layers of cross-linked polyethylene. A layer of cross-linking agent such as t-butylperbenzoate is disposed between the laminate and the heat recoverable material. The resulting assemblage is heated under pressure to activate the crosslinking agent and thereby chemically bond the sleeve material to the laminate. Although having valuable applications, this type of sleeve is handicapped in that if after recovery about a substrate there remains a high level of "unresolved recovery", i.e., above about 70%, the sleeve fails at the bond. For the purposes of this application the percent of unresolved recovery is determined by the following formula:

$$U = (S - R/R)$$

In that formula, $U$ is the percent of unresolved recovery (which may be more than 100), $S$ is the diameter of the substrate about which the sleeve is to be recovered and $R$ is the diameter to which the sleeve would recover if unrestricted. Bond failure with this sleeve occurs by the detachment of the recovered sleeve material from the laminate.

If it is attempted to make a heat recoverable sleeve directly from heat recoverable material using the inserts discussed by Naidoff or Humphries, the weld that is formed is frequently unsatisfactory, as is contains voids and other weak spots. This results because the heat employed in the weld forming process causes the ends of the heat recoverable sheet to begin to recover and withdraw from the insert. To date, therefore, the need for a method of directly forming large sleeves from heat recoverable materials in a manner that the sleeve is capable of tolerating a high percentage of unresolved recovery without failure at the bond line remains unsatisfied.

Accordingly, it is an object of this invention to provide an improved heat recoverable sleeve.

It is another object of this invention to provide a method for making sleeves directly from heat recoverable material capable of tolerating high levels of unresolved recovery.

SUMMARY OF THE INVENTION

According to the present invention, there is provided a method for joining the edges of heat recoverable sheet material. The method comprises disposing between the edges to be joined an insert member containing a heat activated crosslinking agent, superimposing on the insert a reinforcement comprising a foraminous member, for example, a length of woven material, preferably of relatively open weave, and heating the resulting assembly under compression to activate the crosslinking agent and cause the insert to flow and become bonded to the surfaces of the heat recoverable sheet material and the reinforcement.

If desired, a plurality of inserts can be employed. The foraminous member should be capable of withstanding the conditions of the weld formation without significant loss of structural integrity, at least until the weld is formed. A preferred material for the member is woven glass strand. In addition to the foraminous member, the reinforcement can further be comprised of a film, for example a laminate of the foraminous member and the film.

Heat recoverable sleeves can be made by this process without voids or weak spots forming at the weld because withdrawal from the insert is restricted. Furthermore, the sleeves after recovery about a substrate can withstand higher levels of unresolved recovery than those made directly from heat recoverable material by the methods known to the prior art.

BRIEF DESCRIPTION OF THE DRAWINGS

FIG. I is a cross-section of an assembly for making a heat recoverable sleeve prior to compression bonding.

FIG. II is a cross-section of the assembly of FIG. 1 during bonding.

Figure 1:
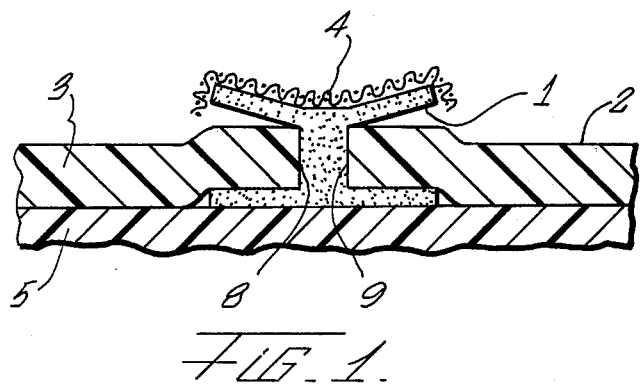
Figure 2:
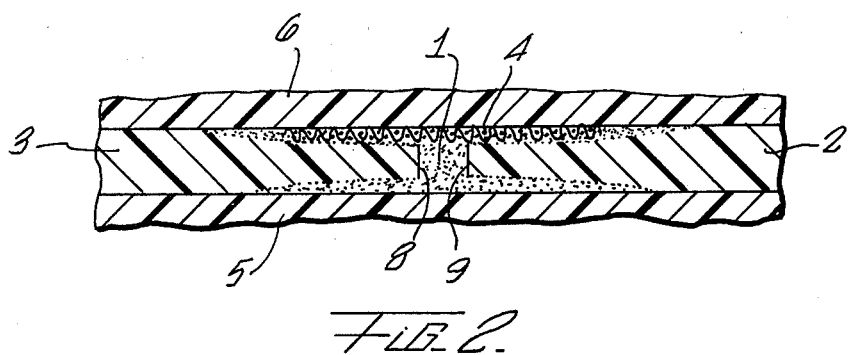
Figure 3:
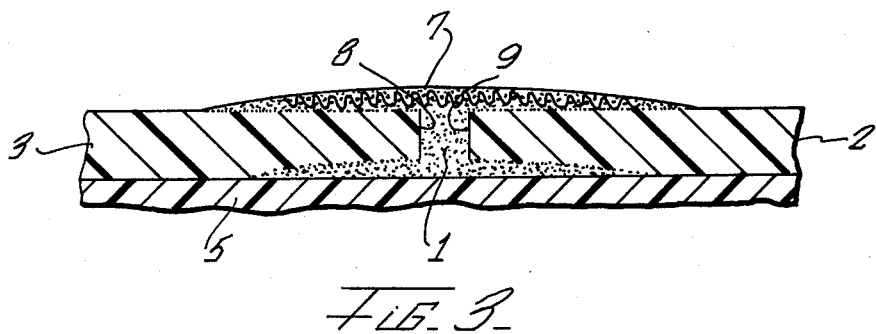
Figure 4:
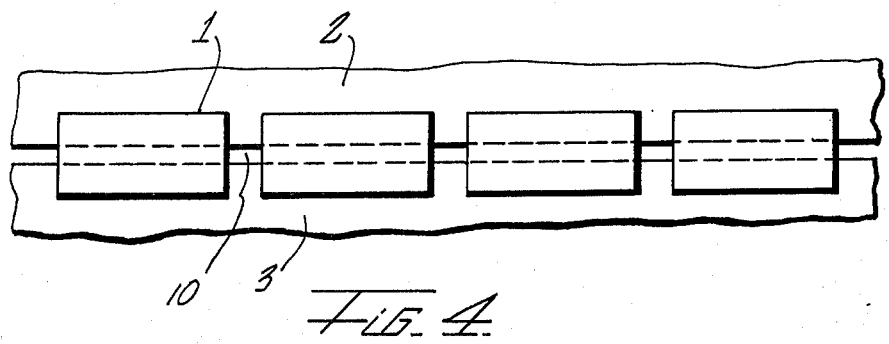
Figure 5:
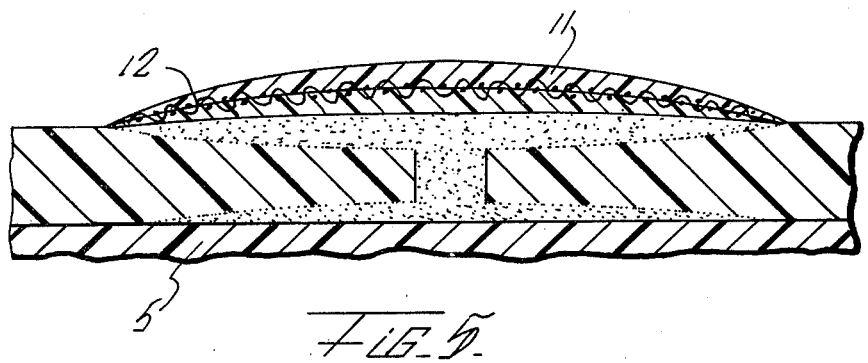
Figure 6:
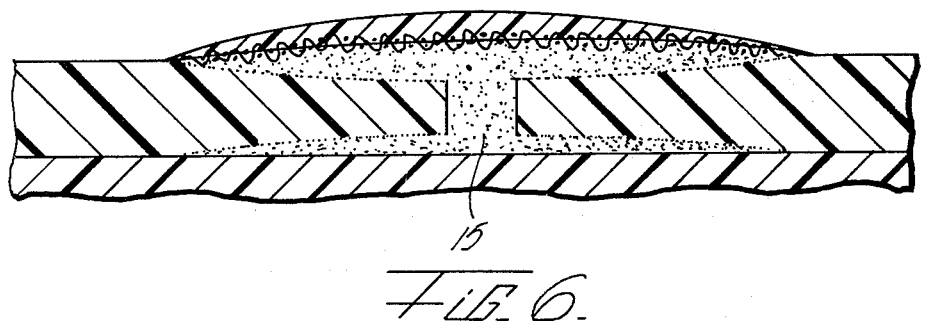

FIG. III is a cross-section of the assembly of FIG. II after bonding.

FIG. IV is a top view of an assembly having a plurality of inserts.

FIG. V is a cross-section of another assembly useful in this invention.

FIG. VI is a cross-section of yet another assembly useful in this invention.

FIG. VII is a cross-section of an insert useful in this invention.

DESCRIPTION OF THE PREFERRED EMBODIMENTS

In a presently preferred embodiment of this invention, a heat recoverable sleeve can be fabricated directly from heat recoverable material. A heat recoverable material is a dimensionally heat unstable material having an "elastic memory". Such a material can be obtained by heating a sheet of a suitable thermoplastic crosslinked crystalline polymer above its crystalline melting point and elongating or expanding it in one or more directions. The sheet is allowed to cool below the crystalline melting temperature while in its elongated form. If heated without restraint above its crystalline melting point, the material will exhibit its elastic memory by returning to its preexpanded dimensions. For use as an element of a heat recoverable sleeve, it is preferred to employ heat recoverable material expanded in a single direction.

Polymeric materials that have been crosslinked by chemical means or by irradiation, for example, with high energy electrons or nuclear radiation, are preferred for use as heat recoverable materials in this invention although other polymers capable of having the property of heat recoverability imparted to them can also be used. As will be discussed in greater detail, the polymer in its expanded form must be capable of undergoing further crosslinking caused by heat activated crosslinking agents since, in the formation of the weld, the insert member and the heat recoverable sheet become covalently bonded to each other. This bond formation is induced by the crosslinking agent. Suitable polymers are of many types and include, e.g., polyolefins, saturated and unsaturated polyesters and polyvinyl halides etc. Also useful are elastomers such as natural rubber, butadiene-styrene copolymers, butadiene-acrylonitrile copolymers, isoprene-isobutylene copolymers, polyisoprene, polybutadiene, polysulfide (Thiokol), polychloroprene (neoprene), polysiloxane (silicone), fluorocarbon (e.g. Vit on), chlorosulfonated polyethylene (Hypalon), and plasticized polyvinyl chloride, and polybutene, etc. Most preferred are the polyolefins e.g., polyethylene; poly (butene-1); various copolymers of ethylene, propylene and butene; ethylene ethyl acrylate, ethylene vinyl acetate, or ethylene methacrylate copolymers in which repeat units derived from the ethylene comonomer predominate (e.g., about 80–90%), and blends of such copolymers containing major proportions of polyethylene itself.

As previously noted, the polymeric articles to be joined are cross-linked from the outset, and preferably exhibit modulus in the range from about 20 to about 60 psi. As used herein, "the term modulus" connotes modulus determined at 150° C and 100% elongation. Articles to be joined are preferably cross-linked by high energy ionizing radiation at dosage levels ranging from, e.g., about 5 to about 20 megarads, preferably from about 12 to about 15 megarads.

The invention finds its preferred application in the joinder of thin-walled articles (e.g., sheet ranging in thichness from about 60 to about 120 mils). An article is "thin-walled" for present purposes when its thickness is substantially less than length or width. Reference to the "primary faces" of joined articles connotes that surface which is the product of length and width as so defined. The invention has proven ideally suited to joining heat recoverable polymeric sheet to form sleeves whose recovered diameter is equal to or greater than 12 in., and commonly equal to or greater than about 18 in.

The thermoplastic polymeric constituent of the insert can be chosen within wide bounds, including a great variety of melt processable materials capable of being cross-linked by heat activated systems. Since the cross-linking agent is most desirably blended with the polymeric constituent of the insert in the melt phase, a predominant consideration in choice of insert thermoplastic is melt processability at temperatures less than the heat activation temperature of the cross-linking agent. With the polyethylenic materials most preferably employed in the articles to be joined, preferred insert polymeric constituents include ethylene-vinyl acetate, ethylenemethyl acrylate and ethylene-ethyl acrylate copolymers and blends of such copolymers with low density polyethylene. Such copolymers commonly contain on the order from about 60 to about 90% by weight repeat units corresponding to the ethylene comonomer, and most commonly contain from about 75 to about 96% by weight of such units.

A wide variety of systems may be mentioned as candidates for the heat activated cross-linking agent, including bisazodicarboxylates such as methyl and ethyl bisazodiformates, sulfonazides such as 1, 10-decane bis(sulfonazide), azodicarbonamine, 3,3'-dimethoxy-4,4'-diazodiphenyl and 2,2'-azobisisobutyronitrile.

Most preferred are peroxide cross-linking agents, e.g., t-butyl perbenzoate, 2,5-dimethyl-2,5-di(t-butyl peroxy) hexyne-3, dicumyl peroxide, benzoyl peroxide, methylethylketone peroxide, cumene hydroperoxide t-butyl hydroperoxide and di-t-butyl peroxide. Such agents are employed in effective cross-linking proportions, as in conventional practice. Most commonly, the agents obtained are coated on a calcium carbonate or other particulate substrate, and are employed in proportions ranging from about ¼ to about 2% by weight active agent, most preferably from about ½ to about 1% by weight active agent. A preferred agent is known to the art as "Varox" which is a mixture of 50% CaCO₃ and 50% 2,5 dimethyl-2,5-di(t-butyl peroxy) hexane. Especially where the amount of cross-linking agent employed is at the lower end of the foregoing ranges, and most especially where non-peroxide cross-linking agents are used, it is preferred to additionally combine in the insert a socalled "co-agent" to maximize the number of cross-links formed through the agency of a given number of free radicals generated by the agent itself. The use of such co-agents is conventional and is discussed in, e.g., L.P. Lenaf, I & E Chem. Prod. Research and Development, 2, No. 3, 202(1963), which publication is incorporated herein by reference. Among conventionally employed co-agents may be mentioned m-phenylene dimaleimide, trimethylol propane trimethacrylate, pentaerythritol tetraacrylate, triallyl cyanurate, triallyl citrate, tetra-allyl pyromellitate and triallyl mellitate. Such co-agents are employed in minor proportions, e.g., 0.5 to 2%, most preferably from about ½ to about 1% by weight. The objects in proportioning cross-linking agents and co-agent are two-fold. Cross-linking must be sufficient to ensure that the modulus of the ultimate weld is at least equal to, and preferably greater than, that of the thin-walled articles joined. Otherwise, the weld may be subject to failure during the high temperature treatment associated with effecting heat recovery of the sleeve. On the other hand, care must be taken to ensure that the weld is not cross-linked to too great an extent, with concomitant embrittlement. Preferably, the modulus of the weld is not greater than about three times that of the article joined. Weld modulus can in particular cases range from about 20 to about 250 psi. However, a substantial failure rate may be experienced at moduli greater than about 150, and most preferably the weld modulus is in the range from about 50 to about 100 psi.

Of course, in addition to cross-linking agent, polymeric constituent and, where used, co-agent, the insert may contain additional conventional addends, e.g., filler, ultra-violet stabilizers, antioxidants, acid acceptors, etc. Fillers such as carbon black, calcium carbonate and the like are employed in substantial (albeit minor) proporations in order to, inter alia, assist in conducting heat from surface to the interior of the insert. Preferably, on the order of about 20% such filler is employed. Specific examples of various compositions useful as inserts for bonding cross-linked articles are disclosed in Ser. No. 436,694 filed Jan. 25, 1974, previously incorporated by reference.

A presently preferred insert formulation comprises:

| | Wt. % |
|---|---|
| low density polyethylene | 48% |
| copolymer of ethylene and methyl acrylate (16%) | 20% |
| terpolymer of ethylene, vinylacetate and methacrylic acid | 5% |
| carbon black | 22.5% |
| stabilizers | 2.5% |
| Varox | 2.0% |

The reinforcement used in combination with the insert comprises a foraminous member, for example, a length of woven cloth or other mesh material. The reinforcement may be further comprised of one or more layers of a thermoplastic film. In a presently preferred embodiment of this invention, the foraminous member is placed directly in contact with the insert. Therefore, it is preferred that the openings in the foraminous member be large enough to allow the thermoplastic material of the insert to penetrate the openings in the member as it begins to flow during the compression bonding process to be described in detail hereinafter.

The foraminous member can be fabricated from a wide variety of materials so long as the resulting member is capable of retaining its structural integrity during the bonding process, at least long enough for the weld to form. Accordingly, the material selected for the foraminous member must have a softening point above the melting point of the thermoplastic polymeric constituant of the insert. Also, the material must not suffer significant degradation during the bonding process.

Suitable foraminous members include lengths of any perforate material, for example, a screen material or a material having holes punched therein, so long as the material possesses the stability characteristics described above. Particularly useful are scrim or cloth materials woven from metal strands, mineral fibers or organic fibers selected from natural and synthetic materials, for example cotton cloth or cloth woven from high melting polyamides. It is presently preferred to use a cloth or scrim woven from glass fibers as the foraminous member since it is a readily available and inexpensive material and satisfies the requisite melting point criterion.

As indicated above, a thermoplastic film can be employed in the reinforcement in conjunction with the cloth. The film must be compatible with the thermoplastic material employed in the insert. Preferably, the film should be a cross-linked polymer so that it will not melt during the bond forming process. It is particularly preferred that the polymeric film contain a heat activated crosslinking agent to facilitate its bonding to the insert. Accordingly, the preferred polymeric film is typically a film having the same composition as the insert although it need not be. The foraminous member and film need not be joined prior to their use in the bond forming process. However, for reasons that will become apparent, it is preferred that they be joined. This can be done by using adhesive or a double faced tape. However, it is preferred to join the film and foraminous member as a laminate. In a presently preferred embodiment this can be done by extruding the film onto a layer of cloth. If desired, the film can be disposed on both sides of the cloth but it is preferred to apply it to one side only.

With reference now to the drawings, the process by which the heat recoverable sleeves are made can be more easily understood. Welding is effected at temperatures sufficient to cause the thermoplastic constituent of the insert to flow and wet the end surfaces of the heat recoverable sheet and to activate the cross-linking system. FIGS. I–III depict in sequence a typical welding operation taken in cross-section along the length of the sheets to be joined and showing a profile of the assembly.

An elongate insert 1, generally I-shaped in cross-section, is disposed between the abutting end surfaces 2 and 3 of a heat recoverable polymeric sheet by inserting the ends of the sheet in the channels defined by the insert. The foraminous member 4, depicted in FIGS. I–III as a simple glass cloth, is superimposed upon the insert. As shown in FIG. I, preferably the member is slightly wider than the insert in order to insure that misalignment with the insert does not result in the insert not being adequately covered by the cloth. Whether the foraminous member is positioned on the side of the insert that will be the exterior side of the sleeve or the interior side does not materially affect the strength of the weld. Preferably, the member should be substantially the same length as the edges of the heat recoverable material that are being joined.

The resulting assembly is compressed, as by heated platens 5 and 6 (FIG. II), which cause the polymeric constituent of the insert to flow and wet the end surfaces of the heat recoverable sheet as well as penetrate the interstices of the woven cloth. Also, the crosslinking agent is activated by the heating of the assembly. Preferably, dams (not shown) approximately in thickness the compressed thickness of the heat recoverable sheet are disposed at either end of the insert and prevent excessive outflow of the melted insert at the weld ends.

Once crosslinking between the melted insert and the polymeric sheet has been effected, the platens may be cooled to reduce the joint in temperature, whereafter the upper platen 6 is withdrawn to free the joint (FIG. III). The platens may be conventionally heated, either electrically or with steam. Preferably, heating and cooling are accomplished by alternately transmitting steam and cooling water through passageways formed in the platen itself.

With reference to FIG. III, it will be noted that the resulting butt weld 7 is contiguous with both the aligned edges 8 and 9 of sheets 2 and 3 and with regions of their primary surfaces immediately adjacent those edges. The weld is made continuous past the aligned edges of the heat recoverable sheet and the cloth in the foraminous member so that failure between the weld and edges 8 and 9 is discouraged. Therefore, the inserts are so dimensioned and positioned so as to insure that adequate thermoplastic material will flow during the welding process to accomplish the desired result. The generally I-shaped insert shown in FIGS. I–III is designed with this in mind.

As indicated above, the foraminous member will preferably be substantially the same length as the weld line. The insert can be also. However, if care is not taken during the welding process, gaseous products that are formed will cause the joint to have voids or blisters. To avoid that problem, a plurality of inserts, as depicted in FIG. IV can be employed. In FIG. IV is shown a top view of a plurality of I-shaped inserts 1 spaced a predetermined distance apart and into which ends 2 and 3 of a heat recoverable material have been inserted. The foraminous member is not shown in FIG. IV.

Spaces 10 in the assembly shown in FIG. IV allow the gaseous products to escape as the weld is formed. Preferably the inserts are spaced so that they flow together during the welding process to form a uniform bond. As few as two inserts separated by a single space 10 may be adequate to avoid the problem associated with the formation of gaseous products during the bonding process.

As indicated above, the reinforcement can be a laminate comprising the foraminous member between two layers of thermoplastic film. Such an assembly, after the weld has been formed, is shown in FIG. V. The two film layers are designated 11 and 12. Welds made employing such a laminate are not troubled by the heat recoverable material withdrawing from the insert during the welding process. However, the bond formed between the reinforcement and the insert are usually not as strong as the bond formed in an assembly such as is shown in FIGS. I–III where the foraminous member directly contacts the insert.

The improved bond strength exhibited by welds such as in FIGS. I–III is thought to be a result of the ability of the thermoplastic constituent of the insert to flow into the interstices of the foraminous member. Accordingly, it is presently preferred to employ a reinforcement wherein a surface of the foraminous member can contact the insert in the welding process.

However, it has been found that when the reinforcement consists solely of the foraminous member, for example, the woven glass cloth, the bonding process can sometimes cause damage to the member by tearing it. This reduces the strength of the weld. Also, the platen atop the member prevents the insert from flowing completely around it. As a result, small voids are present on the surface of the weld adjacent to the openings to the foraminous member. These voids are potential weak points in the weld. Both of these problems can be alleviated by employing a bicomponent reinforcement comprising a foraminous member in combination with a single layer of film. Preferably the film is bonded to one face of the member as this facilitates assembling of the heat recoverable sheet, insert and reinforcement in proper alignment. An assembly, after bonding, made using such a reinforcement is shown in cross-section in FIG. VI. Polymeric film layer 13 is shown on the exterior surface of the cloth 14. Both it and insert 15 penetrate the interstices of the cloth thereby surrounding the strands. The presence of crosslinking agents in the film and insert facilitate their bonding to each other.

The thermoplastic film can vary in thickness. At a minimum it should be thick enough to adequately cover the cloth. A thicker film can impart added strength to the bond. However, the film should not be so thick that the bonding process is impaired. Typically, the film can vary in thickness from at least about 0.5 to about 10 mils in thickness. Preferably, the film is at least about 1 mil in thickness.

With reference now to FIG. VII, there is shown, in cross-section, a presently preferred insert 16 useful in this invention. An end of the heat recoverable sheet is first inserted in the channel formed by converging surfaces 17 of the generally I-shaped member. The insert may have the reinforcement attached to it, for example by using double faced tape or adhesive to facilitate alignment of the components of the assembly between the platens. The resulting subassembly is inserted between the platens and the free end of the sheet inserted into the otehr channel of the I-shaped member. The diverging surfaces 18 of this insert form an opening preferably wider than the thickness of the sheet and thereby facilitate the insertion.

The following examples will illustrate the many advantages of this invention.

were determined and compared. The bond formed from the laminate of Example I had an average breaking strength of 5.3 pounds/inch. Failure occurred at the bond. By comparison, the sample made by using the reinforcing member having the glass cloth laminated on but one side failed at 11.2 pounds/inch.

Table I

|    | SHEET EXPANSION (%) | UNRESOLVED RECOVERY (%) | WELD METHOD | GLASS CLOTH LOCATION | BOND RESULTS | COMMENTS |
|----|---------------------|-------------------------|-------------|----------------------|--------------|----------|
| 1. | 21 | 11 | No Insert | Outside | Pass | 2 Specimens |
|    |    |    | Insert | Inside | Pass | 1 Specimen |
| 2. | 35 | 7 | No Insert | Outside | Pass | 2 Specimens |
|    |    |    | Insert | Inside | Pass | 1 Specimen |
| 3. | 35 | 24 | No Insert | Inside | Fail | 2 Specimens |
|    |    |    | Insert | Inside | Pass | 1 Specimen |
| 4. | 50 | 39 | No Insert | Outside | Pass | 2 Specimens |
|    |    |    | Insert | Inside | Pass | 1 Specimen |
| 5. | 63 | 35 | No Insert | Outside | Pass | 2 Specimens |
|    |    |    | Insert | Outside | Pass | 1 Specimen |
| 6. | 100 | 60 | No Insert | Outside | Pass | 1 Specimen |
| 7. | 100 | 20 | No Insert | Outside | Pass | 1 Specimen |
|    |    |    | No Insert | Outside | Fail | 2 Specimens |
|    |    |    | Insert | Inside | Pass | 1 Specimen |
| 8. | 100 | 71 | No Insert | Outside | Fail | 1 Specimen |
|    |    |    | Insert | Inside | Pass | 1 Specimen |
| 9. | 100 | 84 | No Insert | Outside | Fail | 1 Specimen |

EXAMPLE I

Figure 7:
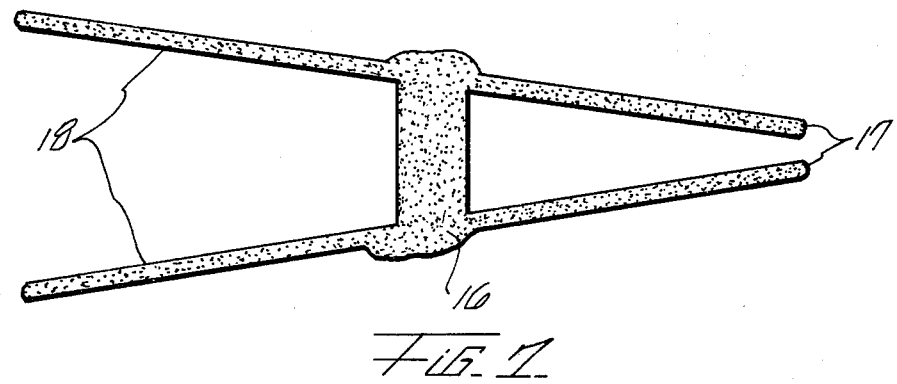

Sleeves were made from heat recoverable material using the insert of FIG. 7 and a laminate of a film comprised of polyethylene bonded to both sides of glass cloth as the reinforcing member. Similar sleeves were made without the insert using a crosslinking agent t-butylperbenzoate between the laminate and the heat recoverable sheet material. The sleeves were recovered about 24 inch pipe with various amounts of unresolved recovery. In some sleeves, the reinforcement was located on the side adjacent the pipe. In others, the reinforcing member was on the outside. Table I summarizes the comparisons between sleeves formed in these two ways.

The data summarized in Table I demonstrates the superiority of the present invention over the prior art method of making heat recoverable sleeves directly from heat recoverable material. Without an insert, bond failure occurred from as low as about 20% to about 71% unresolved recovery whereas the method of this invention resulted in satisfactory bond formation. In similar tests, bonds made in accordance with this invention have satisfactorily withstood 92% unresolved recovery. The advantage to this is that sleeves with high levels of unresolved recovery were tightly conform to the substrate resulting in superior sealing properties. Table I also demonstrates that the insert method can be employed with the reinforcement on either side of the sleeves whereas the best results obtained with the prior art method require the reinforcement to be on the outside of the sleeve.

EXAMPLE II

Reinforced insert welds were made using the laminate reinforcing member of Example I and a laminate wherein only one surface of glass cloth was coated with the polyethylene film. Heat recoverable material having a 100% sheet expansion ratio, i.e., the polymeric sheet had been stretched to twice its original length when made heat recoverable, was employed. Using an Instron, the average breaking strength of the welds The mode of failure was by the sheet tearing rather than by bond failures. This example demonstrates the improvement in bond strength that can be attained when the insert is bonded directly to the cloth.

EXAMPLE III

A variety of welds were made employing different polymeric films as an element of the reinforcing member. The results are summarized in Table II. Each weld employed two generally I-shaped inserts spaced ¼ inch apart. The heat recoverable material was 12 inches in width. Some of the films were crosslinked by radiation. The Beam Dose of the radiation in megarods is given where applicable. Using an Instron, the average breaking strength of the welds was determined.

The results in Table II demonstrate that a wide variety of polymeric films can be employed as a component of the reinforcing member. Relatively thin films such as those employed in these samples did not appreciably increase the bond strength.

The foregoing describes presently preferred embodiments of this invention. It will be apparent to those skilled in the art that modifications can be made without departing from the scope of the invention.

The method of this invention has been described in its application to making sleeves from a sheet of heat recoverable material by joining two opposing edges. It is beyond the scope of this specification to enumerate all the diverse applications to which this invention can be put. However, it will be apparent to those skilled in the art that it can generally be employed in numerous instances when it is desired to join material that is heat recoverable at the edges to be joined. For example, the method of this invention can be adapted to join two or more discrete lengths of heat recoverable sheet material to make a longer length. Such a length could be employed to make wrap around sleeves in the many ways known to the prior art or its opposing end edges could be joined by the method of this invention to form a sleeve.

In another application, material that is not heat recoverable except along the edges which are to be joined can be satisfactorily welded by the method of this invention.

The method of making sleeves described in considerable detail in this specification results in a sleeve of relatively uniform cross-section. However, the method of this can also be applied to making sleeves of irregular shape. For example, sleeves that taper from a relatively large diameter at one end to a relatively smaller diameter at the other can be made by the method to this invention. Similarly, generally Y-shaped sleeves can also be fabricated from heat recoverable material using the method disclosed herein.

The various utilities that are described above are not intended to be an exhaustive list, rather, they are merely illustrative of the applications to which the invention can be put without departing from its scope.

TABLE II

| Sample | Film/Thickness (mils) | | Beam Dose | Average Breaking Strength in lbs/linear inch |
|---|---|---|---|---|
| 1. | None | /NA | None | 5.7 |
| 2. | Copolymer of polyvinyl chloride and polypropylene | /0.5 | None | 5.6 |
| 3. | Elvax 4824 a terpolymer of ethylene, vinyl acetate and methacrylic acid | /7.5 | 10 | 5.0 |
| 4. | Copolymer of ethylene and methyl acrylate (Gulf 70055) | /6 | 10 | 5.4 |
| 5. | low density polyethylene | /0.5 | 20 | 5.7 |
| 6. | copolymer of ethylene and vinyl acetate | /1 | 20 | 6.5 |
| 7. | Gulf 70055 | /1 | 20 | 7.2 |
| 8. | polyethylene | /8 | None | 5.9 |
| 9. | polyethylene | /8 | 5 | 5.6 |
| 10. | polyethylene | /8 | 20 | 6.3 |

I claim:

1. A method of joining abutting ends of heat recoverable polymeric sheet material comprising inserting each of said ends into one of the channels defined by a thermoplastic polymeric insert, said insert comprised of a pair of elongate, generally flat members joined at about their longitudinal axes by the lengthwise edges of a third elongate member, said insert thereby being generally I-shaped in cross-section, containing a heat activatable crosslinking agent, superimposing on said insert a reinforcement comprising a foraminous member and heating said ends, insert and reinforcement under compression for a time and at a temperature sufficient to activate the crosslinking agent and cause said insert to flow and wet said ends and said reinforcement, the reinforcement restricting withdrawal of the ends from the insert during said heating, said crosslinking agent being present in an amount effective to crosslink the insert and covalently bond it to the ends of said heat recoverable material thereby forming a butt weld uniting the ends of said heat recoverable material.

2. The method of claim 1 wherein the ends are opposite ends of a single sheet of heat recoverable material.

3. The method of claim 1 wherein the foraminous member comprises a woven cloth of open weave.

4. The method of claim 3 wherein the cloth is glass cloth.

5. The method of claim 3 wherein the reinforcement is further comprised of a thermoplastic film.

6. The method of claim 5 wherein the film contains an effective amount of a heat activatable crosslinking agent so that when activated the film is crosslinked and covalently bonded to said insert.

7. The method of claim 5 wherein the reinforcement comprises woven glass cloth and a single layer of thermoplastic film.

8. The method of claim 7 wherein the film is laminated to the surface of the glass cloth opposite the insert.

9. The method of claim 5 wherein the reinforcing member comprises woven glass cloth disposed between two layers of thermoplastic film.

10. The method of claim 9 wherein the layers of film are laminated to opposing sides of the glass cloth.

11. The method of claim 3 wherein prior to compression and heating, the reinforcement is wider than the insert.

12. The method of claim 1 wherein the insert is a plurality of generally I-shaped members.

13. The method of claim 12 wherein the reinforcement comprises a woven glass cloth of open weave.

14. The method of claim 13 wherein the reinforcement is further comprised of a polymeric film.

15. The butt welded article obtained by the method of claim 1.

16. The butt welded article obtained by the method of claim 2.

17. A method according to claim 1 wherein said insert further contains a crosslinking coagent selected from the group consisting of m-phenylene dimaleimide, trimethylol propane trimethacrylate, pentaerythritol tetraacrylate, triallyl cyanurate, triallyl citrate, tetraallyl pyromellitate and triallyl mellitate.

* * * * *